United States Patent [19]

Lazzari

[11] 4,078,300
[45] Mar. 14, 1978

[54] METHOD OF MAKING AN INTEGRATED MAGNETIC HEAD HAVING POLE-PIECES OF A REDUCED FRONTAL WIDTH

[75] Inventor: Jean-Pierre Lazzari, Montfort l'Amaury, France

[73] Assignee: Compagnie Internationale pour l'Informatique, Louveciennes, France

[21] Appl. No.: 748,471

[22] Filed: Dec. 8, 1976

Related U.S. Application Data

[62] Division of Ser. No. 598,000, Jul. 22, 1975, Pat. No. 4,016,601.

[30] Foreign Application Priority Data

Oct. 1, 1975 France ............................. 75 00652

[51] Int. Cl.² ............................................. G11B 5/42
[52] U.S. Cl. ...................................... 29/603; 360/119
[58] Field of Search ................... 29/603; 360/119–123, 360/125–127

[56] References Cited

U.S. PATENT DOCUMENTS

| 3,344,237 | 9/1967 | Gregg | 29/603 X |
| 3,514,851 | 6/1970 | Perkins et al. | 29/603 |
| 3,633,274 | 1/1972 | Miyata | 29/603 |
| 3,706,926 | 12/1972 | Barrager et al. | 29/603 X |
| 3,787,964 | 1/1974 | Simon et al. | 29/603 |
| 3,846,842 | 11/1974 | Lazzari | 360/126 |

Primary Examiner—Carl E. Hall
Attorney, Agent, or Firm—Kemon & Estabrook

[57] ABSTRACT

The invention concerns an integrated magnetic head adapted to cooperate with a track of a very narrow width, f.i. of about 20 microns, of a recording medium which moves perpendicularly to said width in close proximity to the frontal gap face of the head. The frontal width of the pole-piece layers of the head is reduced after said layers have been formed with a larger width adapted to a normal electromagnetic efficiency of the head in the parts of the said pole-pieces which encase the front branch of its flat conductor winding coil. The reduction is obtained by removal of the lateral parts of the pole-pieces over a predetermined depth with respect to the frontal face. Any registering part of an intervening dielectric layer between the pole-piece layers for defining the magnetic gap of the head is simultaneously removed. It is important that the removal be made by an attack such as a ionic erosion process perpendicularly oriented to the frontal plane of the head. The depth of removal may be of the order of 5 to 6 microns when the reduced width must be about twenty microns and when, further, the ratio of the overall thickness of the pole-piece layers and intervening layer at the frontal face of the gap to the said reduced width is higher than two.

2 Claims, 4 Drawing Figures

METHOD OF MAKING AN INTEGRATED MAGNETIC HEAD HAVING POLE-PIECES OF A REDUCED FRONTAL WIDTH

This is a division of application Ser. No. 598,000, filed July 22, 1975, now U.S. Pat. No. 4,016,601.

SUMMARY OF THE INVENTION

The present invention concerns improvements in or relating to integrated magnetic heads wherein 1. the magnetic airgap is defined in the frontal plane of the head structure by a pair of magnetic pole-piece layers having one or more spacing non-magnetic layers between them, 2. a flat conductor winding coil presents a front branch inserted between the said magnetic pole-piece layers but the front edge of said branch is recessed with respect to the frontal plane of the structure and consequently with respect to the magnetic gap.

It is now possible in the art of magnetic recoding to provide quite narrow widths for the recording tracks of the magnetic recording medium which moves in close promimity to the magnetic gaps of the heads. It is consequently important that the gaps of such heads be made with very narrow widths in a direction parallel to the tracks of the medium. It is quite possible now that the width of a recording track be as low as about twenty microns and even as low as about ten microns for special purposes such as industrial telecontrol and telesignalling.

However, the manufacture of integrated magnetic heads having correspondingly low transverse widths of their magnetic gaps gives rise to several difficulties, mainly for heads which must be adapted to either read or write the records. It is a general object of the present invention to solve these problems.

The first problem is to obtain a high accuracy of the transverse width of a magnetic gap for values as low as twenty microns and less. Manufacturing an integrated head from the well known evaporation process of the materials of its layers is quite attractive per se. An application of this process to the manufacture of magnetic heads is, for instance, fully described in U.S. Pat. No. 3,846,842 dated Nov. 5, 1974 in the name of the same applicant. Evaporations are made through suitably apertured masks. Such a mask cannot have a thickness less than about 50 microns and the width of a layer which is deposited through such a mask cannot be defined with an accuracy better than, at most, ± 5 microns and usually about ± 10 microns. This is quite satisfactory for widths of about 100 microns or even down to about 50 microns. Such values of the accuracy as above mentioned obviously are far too poor when the required width of a deposited layer must approximate 20 microns.

Another problem due to such a small width of the pole-piece layers concerns the electromagnetic efficiency of the head. If the layers were restricted to the said twenty microns along their whole length from front to rear, the efficiency will fall to a prohibitively low value unless the number of turns of the flat conductor winding coil is so unduly increased that, in turn, it results in a prohibitive overall thickness of the head structure. It is consequently necessary to maintain the transverse width of the pole-piece layers at a higher value at places other than at the magnetic gap.

At first thought, a solution of such problems must resort to an attack of the layers in the parts thereof which are superposed for defining the magnetic gap, after such layers have been deposited by a process which does not enable the obtention of the required width with the appropriate accuracy. However, putting this solution into actual practice encounters, in turn, several difficulties:

Where an attack must be so selective that the required accurately defined magnetic gap width of about 20 microns is obtained, the structure of the gap is a superposition of layers each of which must be thick enough to prevent, when submitted to an acid attack as etching, producing an irregular profile which would destroy the homogeneity of the completed product.

The write and read operations which will be imparted to the resulting magnetic head will concern recording media of varied "hardnesses" of record, from truly hard records, of a coercive field of about 100 oersteds to softer records of a coercive field down to about 1000 oersteds. Whereas, for a writing operation, it is advantageous so to shape a magnetic layer that the inductor field towards the record track is concentrated, the shape must not produce domains in the magnetic layer of walls of magnetization which would generate de-magnetization fields and consequently destroy the level of any read-out signal. A satisfactory read-out can only be obtained with a uniform magnetization of the layer up to its frontal edge.

It is an object of the invention to further solve such difficulties encountered for shaping a pole-piece gap portion of an integrated magnetic head.

According to a feature of the invention, such a shaping results from a selective attack of ionic character oriented perpendicularly to the frontal face of the magnetic gap structure of the lateral parts of said structure to a depth of at least 3 microns and at most of about 10 microns, preferably of about 5 to 6 microns, said magnetic gap structure being of a thickness of at the most 3 microns (not comprising the thickness of one of the pole-piece layer of the structure) and the ratio of the width of a pole-piece under the coil of the head to the width of the magnetic gap in the frontal plane having a value at least equal to two and, preferably, about 4 to 5.

Surprisingly, applicant has surprisingly found that, for such a dimensioning of the head and such a depth of the frontal ionic attack, not only does the resulting shape present the accurately required narrowness of the frontal face of the magnetic gap but, further, both the concentration of any writing magnetic field in such a narrow width and subsequent elimination of any corner effect near the edge of the gap, and a complete absence of magnetic domain walls in the magnetic material of the pole-piece layers, and subsequent absence of any demagnetizing fields therein is also achieved.

Further, the value of the depth herein above defined is quite compatible with usual dimensions of integrated magnetic head structures as it is lower than the usual recess distance of the front edge of the coil with respect to the frontal edge of the substrate. The usual recess is about 10 microns, or even more. Consequently the invention does not influencing in the wrong direction the interaction between the coil and the pole-piece layers which cooperate in the structure.

BRIEF DESCRIPTION OF THE DRAWINGS

The invention will be described in full detail with reference to the accompanying drawings, wherein.

DETAILED DESCRIPTION

Figure 1A:
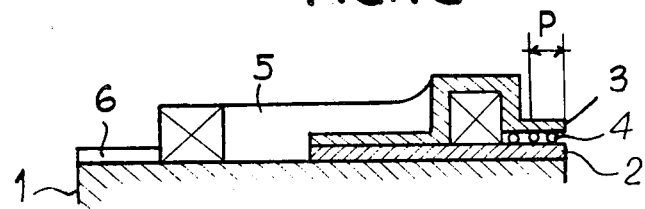
FIG. 1 shows in two views 1a and 1b, respectively, a cross-section and a top view of an integrated magnetic head structure according to the invention.

The magnetic head structure consists, on a substrate 1, of a piling of layers which are successively deposited by a selective evaporation process through appropriate masks according to a well-known technique. Application of this technique to a magnetic head is, for instance, disclosed in the above mentioned U.S. patent, and it will be assumed that the head of FIG. 1a and FIG. 1 b has been made according to the teaching of this patent.

Figure 2:
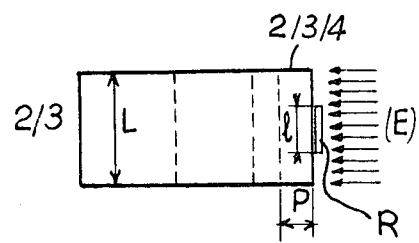
FIG. 2 shows the means for obtaining the shape of the front part of the head as provided according to the invention, and, FIG. 3 illustrates in graphic form certain advantages of the heads of the invention with respect to conventional ones.

Generally, the structure comprises a first magnetic layer 2 which is of substantially rectangular form as shown in FIG. 2. Over said layer, an edge of which registers with the frontal face edge of the substrate, facing for instance a magnetic tape or band B which moves in the direction indicated by the arrow end P. On this magnetic medium, any track is of a width P and consequently, the facing magnetic gap must preferably have a width 1 substantially equal to P. Instead of a magnetic band, the medium may be a magnetic disc or drum.

Over the layer 2 is formed a non-magnetic insulating layer 4 and over these layers is formed a flat conductor winding coil 5, having rear output leads 6 to the rear of the substrate. Over the layer 4 and part of the coil as well as over the rear part of the layer 2, all these parts being exposed at this time instant of the process, is formed a second magnetic layer 3. Front parts of the layers 2 and 3 spaced apart by the layer 4 define the magnetic read/write gap of the head.

Up to now, the width of the airgap was of the same value L as the rectangular pole-pieces 2 and 3. The length L did not necessitate any accuracy, provided it was such that the electromagnetic efficiency of the structure was a good one. The width of the track being reduced, it becomes necessary that the width of the magnetic gap be accurately defined because the mechanism for accessing the tracks must be more definite. It is however necessary to preserve a width L of a satisfactory value for the efficiency of the head.

Figure 1B:
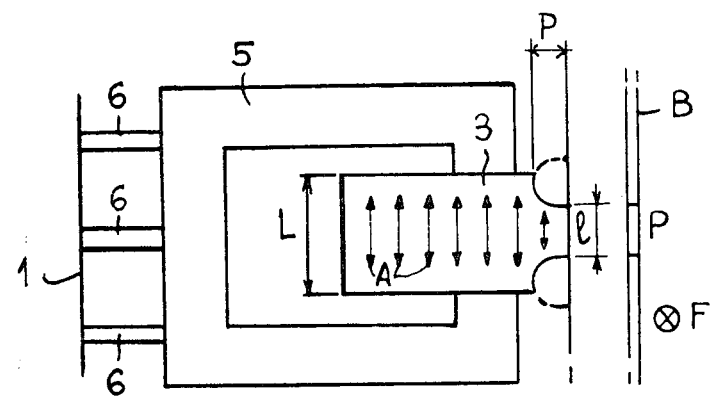

It is consequently provided to shape the layers constituting the gap, i.e. the layers 2 and 3 and any such intermediate layer as 4 as shown in FIG. 1b. This width 1 in the frontal plane cannot be directly obtained since, as said, this width must be of the order of twenty microns whereas the evaporation process does not permit production of a layer with, at most, an accuracy by ± 5 microns, more usually ± 10 microns.

The shape imparted to the magnetic gap part of the layers 2 and 3 must further be such that their magnetization will remain uniform in the direction of the axis of anisotropy of the material. The direction of this axis of anisotropy, identical to the axis of easy magnetization, is shown by arrows A in FIG. 1b. This anisotropy has been induced during the formation of these layers and no anisotropy must be forced by the later shaping to disturb this one.

The width $l$ is a data external to the design of the head. The width L is determined by considerations related to the electromagnetic efficiency of the head. Consequently the only parameter which is totally free is the depth $p$ of the attack between the front edge of the substrate and the parallel plane at which the attacked parts of the gap reconcile the lateral sides of the unattacked parts of the magnetic layers 2 and 3. The value of $p$ must not, however, exceed the recess of the front edge of the coil 5 with respect to the front edge of the substrate. Usually, this recess is about 10 microns.

Applicant has discovered that it will suffice if $p$ is made of the order of three to ten microns, but in any case greater than the thickness of one of the magnetic layer plus the thickness of the intermediate layer 4 in the frontal plane, to ensure that the required technical effects are fully satisfied, i.e. limitation of the inductive writing field to the width $l$ and absence of the perturbation of the magnetization in the pole-piece layers. The value of $p$ will preferably be made substantially equal to 5 or 6 microns with $l$ substantially equal to 2 and the ratio $L/l$ substantially higher than 2.

The shape may be obtained by an ionic attack oriented, as shown at E in FIG. 2 perpendicularly to the frontal plane of the structure, after a resist R has been coated over the part of the magnetic gap to be protected against the attack. It is a matter of choice whether the substrate is simultaneously submitted to the attack from the ionic gun. When it is, the final shape is such as shown in the view of FIG. 1b. Etching would be more difficult, if not impossible to obtain a satisfactory result because the structure to be attacked is a composite one made of layers of distinct materials, namely magnetic and dielectric. In some cases, not only a single dielectric layer will exist between the pole-piece layers but conductive non-magnetic layers sandwiched between dielectric layers, and the invention is also applicable to such a magnetic gap structure.

It may be theorized that the small value of the depth of the attack is due to the fact that the gradient of the fields is very important within the magnetic circuit of an integrated head.

Figure 3:
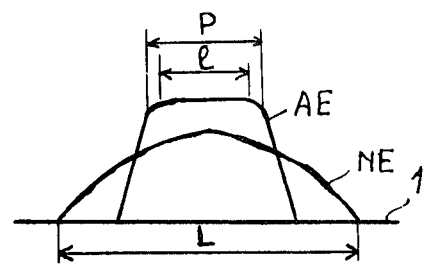

The shape which is so provided for an integrated magnetic head structure is of special advantage when the head operates for writing information on the recording medium since the magnetic flux lines are concentrated in the front edge parts of the magnetic gap. The unwanted corner effects are consequently highly reduced, if not eliminated, on the track P. Further, the efficiency of a read-out operation is increased proportionally to the value of the ratio $L/l$. This increase may be better appreciate with reference to FIG. 3. The curve NE shows the distribution of the magnetization within the pole-piece layers when the front width is maintained at the value L, whilst the width of the track is P. AE shows the corresponding distribution when the width of the magnetic gap at the level of the frontal plane is reduced to $l$, which preferably is made slightly lower than P.

What is claimed is:

1. In a method of manufacturing an integrated magnetic head on an insulating substrate having front and rear edges by evaporative deposition of the pole-piece layers, non-magnetic gap forming layers and flat coil layers with the front of the coil spaced rearwardly from and the pole-pieces being even with the front edge of the substrate, the improvement comprising; the step of subjecting the frontal magnetic gap surfaces of said pole-piece and non-magnetic layers to erosive attack perpendicular to the frontal surfaces thereof while protecting a center portion by a mask in order to remove portions of said pole-piece and non-magnetic layers on either side of said mask to a depth not exceeding the distance between the front edge of said coil and the front edge of said substrate but greater than a distance equal to the sum of the thickness of one of said pole-piece layers and said non-magnetic layers to define a pole-piece width in the frontal magnetic gap surface no greater than one-half the width of the originally evaporative deposited layers.

2. Method according to claim 1, wherein said attack is conducted from a ionic erosion gun.

* * * * *